United States Patent
Tao et al.

(10) Patent No.: US 10,448,454 B1
(45) Date of Patent: Oct. 15, 2019

(54) SELF-ORGANIZING DISTRIBUTED TASK COORDINATION FOR AD-HOC COMPUTING ENVIRONMENT

(71) Applicants: EMC Corporation, Hopkinton, MA (US); EMC IP Holding Company LLC, Hopkinton, MA (US)

(72) Inventors: Simon Tao, Shaghai (CN); Yu Cao, Beijing (CN); Xiaoyan Guo, Beijing (CN); Zhe Dong, Beijing (CN); Kenneth Durazzo, San Ramon, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 171 days.

(21) Appl. No.: 15/076,069

(22) Filed: Mar. 21, 2016

(51) Int. Cl.
| | |
|---|---|
| *H04L 29/08* | (2006.01) |
| *H04W 84/18* | (2009.01) |
| *G06F 9/50* | (2006.01) |
| *G06F 9/48* | (2006.01) |

(Continued)

(52) U.S. Cl.
CPC .............. *H04W 84/18* (2013.01); *G06F 9/48* (2013.01); *G06F 9/5083* (2013.01); *G06F 16/27* (2019.01); *H04L 45/60* (2013.01); *H04L 67/1095* (2013.01)

(58) Field of Classification Search
CPC ....... H04L 67/12; H04L 67/18; H04L 47/125; H04L 67/125; H04L 67/1031; H04L 67/1095; H04L 41/0816; H04L 45/00; G06F 11/2023; G06F 11/1443; G06F 16/273; G06F 16/27; G06F 16/2379; G06F 16/2365; G06N 99/005
See application file for complete search history.

(56) References Cited

U.S. PATENT DOCUMENTS

| | | | | |
|---|---|---|---|---|
| 6,553,423 | B1 * | 4/2003 | Chen ....................... | H04L 45/02 370/401 |
| 7,937,482 | B1 * | 5/2011 | Vermeulen .......... | G06F 11/1425 709/229 |

(Continued)

OTHER PUBLICATIONS

International Telecommunication Union, "Series Y: Global Information Infrastructure, Internet Protocol Aspects and Next-Generation Networks, Next Generation Networks—Frameworks and Functional Architecture Models, Overview of the Internet of Things," Recommendation ITUT Y.2060, Jun. 2012, 22 pages.

*Primary Examiner* — Chirag R Patel
(74) *Attorney, Agent, or Firm* — Ryan, Mason & Lewis, LLP

(57) ABSTRACT

Processing nodes in a distributed ad-hoc computing environment are discovered, wherein each processing node is configured to discover other processing nodes. A set of candidate processing nodes is selected from the discovered processing nodes. Selection is based on each discovered processing node advertising its own capabilities to other processing nodes, and processing nodes are selected as candidates based on their advertised capabilities. A subset of processing nodes is formed from the set of candidate processing nodes. The subset of processing nodes forms a self-organized task coordination ensemble wherein each processing node in the task coordination ensemble executes the same consensus protocol. By way of example, the distributed ad-hoc computing environment comprises an IoT network and the processing nodes are IoT devices.

20 Claims, 2 Drawing Sheets

(51) Int. Cl.
*H04L 12/773* (2013.01)
*G06F 16/27* (2019.01)

(56) References Cited

U.S. PATENT DOCUMENTS

| | | | |
|---|---|---|---|
| 2012/0011398 A1* | 1/2012 | Eckhardt | G06F 11/2028 714/15 |
| 2014/0359131 A1* | 12/2014 | Seed | H04L 47/125 709/226 |
| 2015/0244613 A1* | 8/2015 | Sullenberger | H04L 41/5012 370/400 |
| 2015/0358777 A1* | 12/2015 | Gupta | H04L 12/2807 370/254 |
| 2016/0066137 A1* | 3/2016 | Kulkarni | H04W 4/02 455/456.1 |
| 2016/0205106 A1* | 7/2016 | Yacoub | H04L 61/1511 726/28 |
| 2017/0220663 A1* | 8/2017 | Zhao | H04L 67/06 |

* cited by examiner

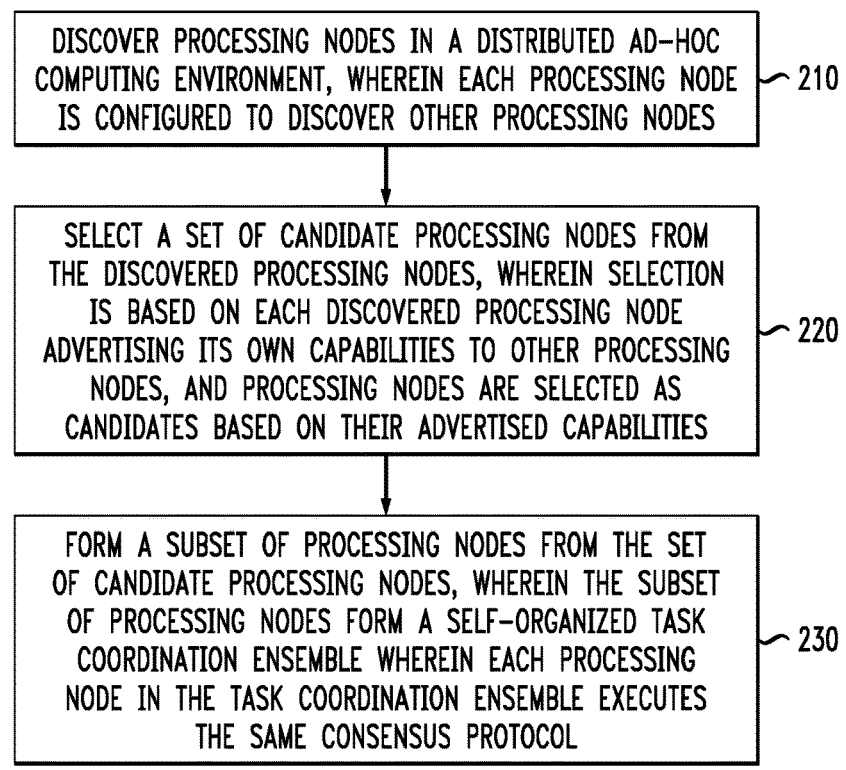
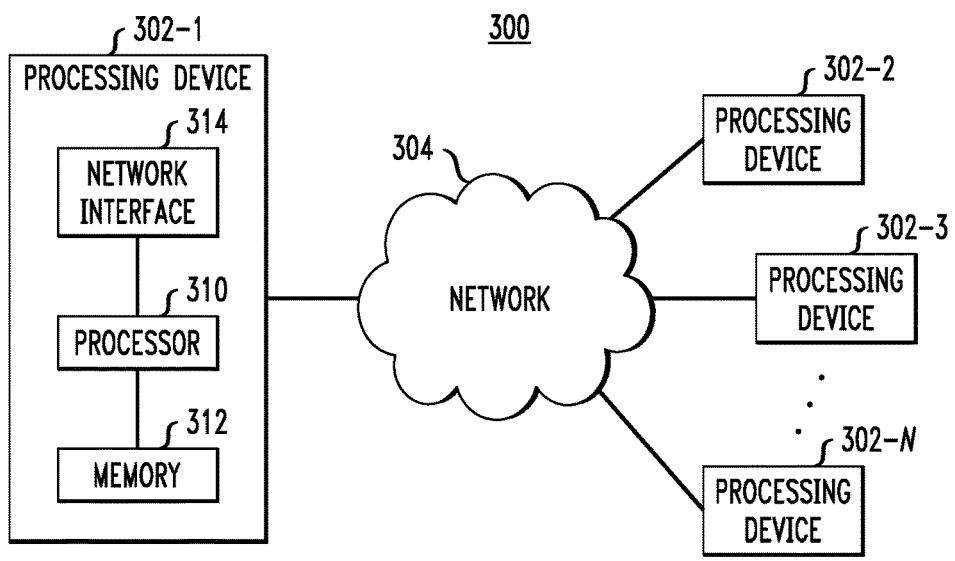

SELF-ORGANIZING DISTRIBUTED TASK COORDINATION FOR AD-HOC COMPUTING ENVIRONMENT

FIELD

The field relates generally to computing environments, and more particularly to distributed task coordination in ad-hoc computing environments.

BACKGROUND

As defined by the International Telecommunication Union in ITU-T Recommendation Y.2060 dated June 2012, the "Internet of Things" (IoT) is a global infrastructure for the information society, enabling advanced services by interconnecting (physical and virtual) things based on existing and evolving interoperable information and communication technologies.

For example, in a typical IoT deployment, there are a large amount of electronically interconnected devices with different capabilities. The IoT devices can form a heterogeneous ad-hoc network wherein diverse devices such as, for example, sensors, actuators, radio frequency identification (RFID) tags, and smartphones, interact with each other to achieve a common goal. However, a major challenge is how to coordinate these distributed and diverse devices with no or very little underlying infrastructure support.

SUMMARY

Embodiments of the invention provide techniques for distributed task coordination in ad-hoc computing environments.

For example, in one embodiment, a method comprises the following steps. Processing nodes in a distributed ad-hoc computing environment are discovered, wherein each processing node is configured to discover other processing nodes. A set of candidate processing nodes is selected from the discovered processing nodes. Selection is based on each discovered processing node advertising its own capabilities to other processing nodes, and processing nodes are selected as candidates based on their advertised capabilities. A subset of processing nodes is formed from the set of candidate processing nodes. The subset of processing nodes forms a self-organized task coordination ensemble wherein each processing node in the task coordination ensemble executes the same consensus protocol.

In illustrative embodiments, the distributed ad-hoc computing environment comprises an IoT network and the processing nodes are IoT devices. Advantageously, illustrative embodiments provide a consensus based coordination infrastructure built upon the distributed IoT nodes and implement a task assignment approach based on the coordination infrastructure to allow self-organizing in fulfilling a task goal.

These and other features and advantages of the invention will become more readily apparent from the accompanying drawings and the following detailed description.

BRIEF DESCRIPTION OF THE DRAWINGS

FIG. 2 illustrates a self-organizing task coordination ensemble formation methodology for use in a distributed ad-hoc computing environment, according to an embodiment of the invention.

FIG. 3 illustrates a processing platform used to implement a distributed ad-hoc computing environment with self-organizing task coordination functionality, according to an embodiment of the invention.

DETAILED DESCRIPTION

Figure 1:
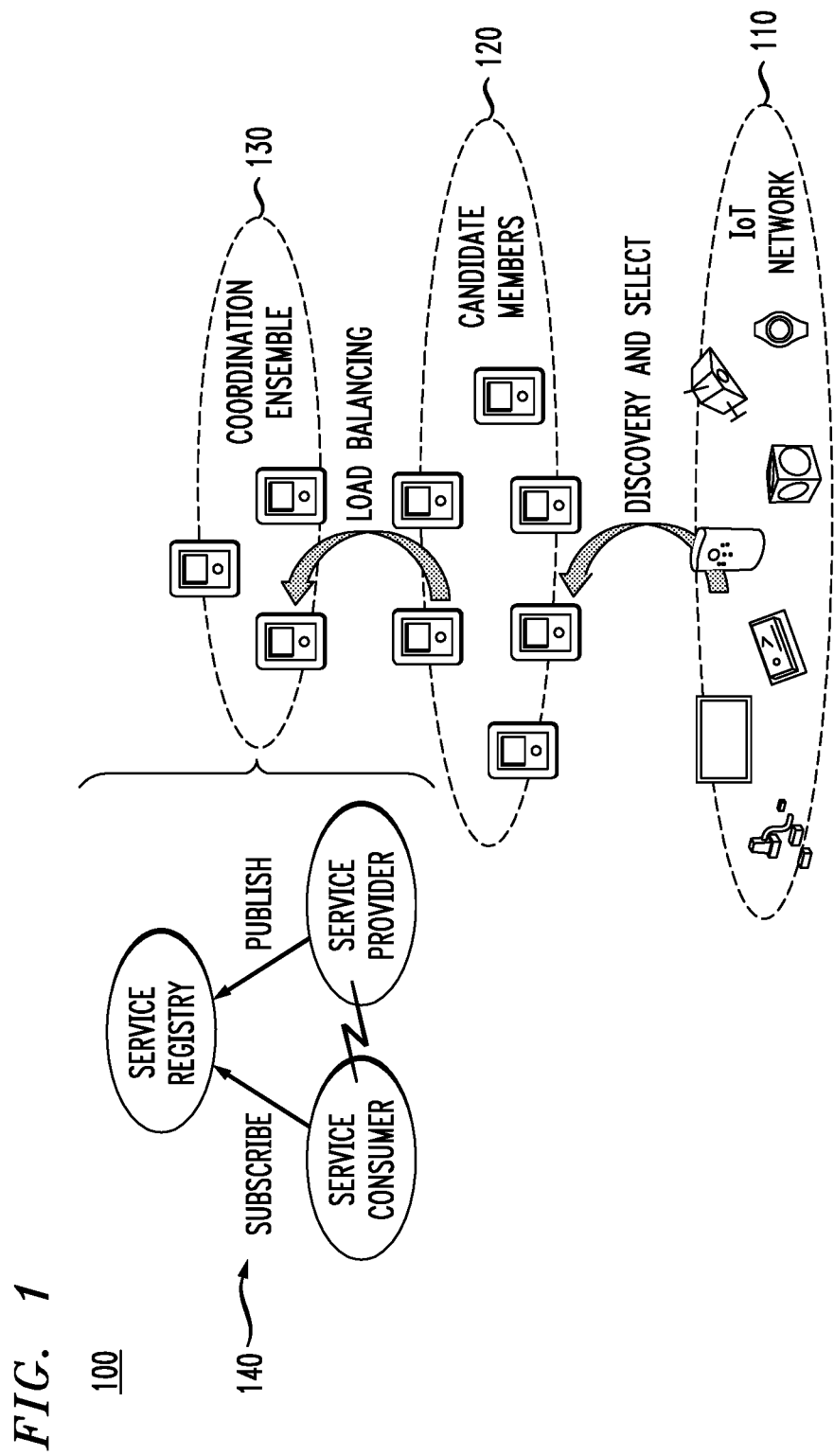
FIG. 1 illustrates a distributed ad-hoc computing environment with self-organizing task coordination functionality, according to an embodiment of the invention.

Illustrative embodiments may be described herein with reference to exemplary IoT deployments. It is to be appreciated, however, that embodiments of the invention are not restricted to use with the particular illustrative system and device configurations shown. Rather, embodiments of the invention are more generally directed to any distributed ad-hoc computing environment. However, a given embodiment may more generally comprise any arrangement of one or more processing devices.

As used herein, the term "ad-hoc" with respect to a computing environment or network illustratively means a decentralized type of network of processing devices or nodes wherein the formation of the network does not rely on a pre-existing infrastructure (or relies very little on any such pre-existing infrastructure) such as routers in wired networks or access points in managed wireless networks.

As used herein, the term "consensus protocol" with respect to a computing environment or network illustratively means an algorithm that attempts to agree on one result (e.g., a task goal) among a group of participant devices. This problem becomes difficult when the participant devices or their communication medium tend to experience failures. Consensus protocols attempt to alleviate this failure problem by employing a state machine replication approach across the distributed processing devices. In state machine replication, an algorithm is converted into a fault-tolerant, distributed implementation by requiring each processing device in the implementation to maintain the same state machine. Thus, if one device fails, another can take over its function (e.g., as leader or follower).

In many IoT deployments, cooperating nodes (processing devices) collaborate together in performing a target application program (application). The nodes usually discover and communicate with each other (mostly with wireless connections) in an ad-hoc manner with no or very little infrastructure support. At the same time, IoT nodes are typically resource constrained devices with limited resources available including central processing unit (CPU) resources, memory resources, storage resources, and power resources. The distinction between "memory" and "storage" is that memory typically includes volatile devices such as random access memory devices or the like, while storage includes non-volatile devices such as disk drives, flash drives or the like that provide longer term data retention. In any case, the direct ramification from the above facts is that it is very difficult to coordinate the distributed nodes effectively and reliably in a self-organizing manner to achieve the designated application goal.

Embodiments of the invention overcome these and other drawbacks. To solve the existing problems, we decompose the problem into a set of sub-problems and address them accordingly.

First, the IoT nodes need to discover each other so that they can form a cohort within which they collaborate with each other. Second, the IoT nodes should be able to advertise the capability/service they can provide, as well as publish the service they depend on. To ensure interoperability, services should be presented in a standard way that is agreed upon by their providers and consumers. Third, there should be some reliable infrastructure for publishing and subscribing the service information, as well as for other coordination purposes. Lastly, there should be a coordinator/scheduler for assigning tasks and managing the progress of the application being executed by the IoT nodes.

Embodiments of the invention provide an overall framework that addresses the above sub-problems, as well as other problems with existing approaches. More specifically, embodiments provide: (i) a consensus-based coordination infrastructure built upon the distributed IoT nodes; and (ii) a task assignment approach based on the coordination infrastructure to allow self-organizing in fulfilling the application goal.

In a typical IoT deployment, there will be a large amount of interconnected devices with different capabilities. The IoT devices form a heterogeneous network wherein diverse devices such as sensors, actuators, RFID tags and smartphones interact with each other to achieve a common goal. It is desirable to provide a self-organizing approach to effectively coordinate these devices with as little human-interference as possible. However, the lack of core enabling functionality makes current IoT deployments unable to accomplish a high degree of self-organization.

In general, in a distributed environment, a coordination infrastructure is required for any kind of application goals that involve multiple devices to cooperate with each other. There have been some consensus-based protocols designed for distributed coordination, such as Zab (ZooKeeper Atomic Broadcast) and Raft. However, these protocols are designed for a general-purpose approach, without taking IoT specifics into consideration. For example, in traditional data centers, nodes fail in an unpredictable and thus disruptive manner. For IoT devices, they may fail due to loss of power, which is much more predictable. Failing to take advantage of these specific characteristics of an IoT network, a consensus ensemble may be more likely to be unavailable because of the unavailability of a quorum caused by resource limitation. To the contrary, by leveraging cluster resources properly, the consensus ensemble can achieve higher availability in the presence of the aforementioned limitations.

Furthermore, since no abstraction is defined for a general goal of task assignment for an IoT network, there is no generic approach available for organizing the cooperation between the interconnected IoT devices.

Embodiments of the invention provide tailored solutions accordingly in the context of self-organizing task assignment in IoT ad-hoc networks. The major characteristics of such an environment are that it is highly dynamic and resource-constrained. Advantageously, embodiments are able to construct a highly reliable, available and collaborative computing environment that is: resource-aware; service-oriented; and automatic and agile.

FIG. 1 illustrates a distributed ad-hoc computing environment with self-organizing task coordination functionality, according to an embodiment of the invention. The environment 100 designates three groups of IoT devices: a network of IoT devices or nodes 110, a set of candidate members 120 discovered and selected from the IoT network 110, and a task coordination ensemble 130 of load-balanced IoT devices selected from the set of candidate members 120. An exchange of subscribe and publish functionalities of the coordination ensemble 130 is depicted as 140 in environment 100.

It is realized herein that not every IoT device in the IoT network 110 will become a member of coordination ensemble 130. To become a member of the candidate set 120 from which the coordination ensemble 130 will be selected, an IoT device should have sufficient resources such as:

Computing power: However lightweight the consensus implementation is, it consumes computing power on the device. A coordination ensemble composed of devices with extremely low computing power only results in lower availability and is not practical.

Durable storage: To make the coordination ensemble devices survive process failure, we require them to have some local storage for maintaining a durable log of state changes.

Reliable network connectivity: Devices in the coordination ensemble should be connected and can exchange message pairwise for enough period of time for the consensus algorithm to make progress with a quorum of devices.

Power supply: The devices would have reasonably sufficient power supply, as long as there will be a quorum of resource-abundant devices available for running the consensus protocol and hosting the state.

In forming the coordination ensemble, we require that candidate devices can discover each other, advertise their capability, and the most resource-sufficient ones (in an illustrative embodiment, typically 3 or 5) from them form the coordination ensemble. Generally, it is required that each device of the coordination ensemble is configured to implement the consensus protocol and thus can exercise the role of either follower or leader. Once the system is bootstrapped with an established coordination ensemble, the available candidate devices are managed "centrally" in the coordination ensemble itself, which allows further optimization in membership change and load-balancing as will be explained below.

Because of the limited processing capability on IoT devices, we do not expect the consensus ensemble will need to support massive scaling deployment. For a large scale IoT network, dedicated coordination infrastructure will be more appropriate. That being said, with an infrastructure-less approach as proposed in illustrative embodiments herein, we benefit from the resulting agility and are free from related administration effort for small or medium-sized deployments.

For the coordination infrastructure, there have been some practical implementations available. Zookeeper and Raft-based implementations are the most popular ones. Those implementations are crafted with the replicated state machine mode, wherein the same sequence of commands are replicated and applied on multiple state machines that are distributed in a cluster. As long as a majority of the nodes are alive, the system as a whole can make progress and serve coordination tasks. However, those implementations are constructed for general distributed systems deployed in data centers, without accounting for the specifics of an ad-hoc IoT network. With embodiments of the invention, besides the safety, liveness and efficiency provided by those generic coordination implementations, the following additional features/traits are also provided:

Light-weight: Given the limited resources on an IoT device, the coordination infrastructure must be as simple as possible. It is highly desirable to have an implementation with a small footprint and which consumes a small amount of resources at runtime.

Support membership change: It is conceivable that an outage will be more common in an infrastructure-less environment such as an IoT network. When some member of the consensus cluster or coordination ensemble 130 (usually composed of 3 or 5 nodes) becomes unavailable, new members from candidate set 120 can join in to ensure availability while safety properties are guaranteed.

Load balance: IoT devices have limited resources in computing, memory and storage, in fact, many of them are battery-powered. To maintain a self-organizing application while judiciously leveraging all the resources from these resource-constrained devices is a challenge. In illustrative embodiments, this is achieved by the following:

(i) In the discovery phase, the IoT devices advertise their capability and the devices with sufficient resources will become members of the coordination ensemble.

(ii) If the device that participates in the coordination ensemble is stressed, for example, its battery is about to be drained, a new member is selected to join the cluster. This process is monitored and orchestrated with the coordination ensemble itself and supported by the membership change feature from the ensemble.

(iii) A decision is made by one member of the coordination ensemble which is elected as a leader that is responsible for balancing the load. This requires that every member of the ensemble has the load balance algorithm embedded to exercise the role of decision maker and if the leader fails, a new leader is elected to continue.

Furthermore, illustrative embodiments provide a generic task assignment approach:

(i) Definition of an abstract layer for service orchestration. The capabilities of any IoT device can provide or will depend on the concept of a service. The exposed service can be presented in the representational state transfer or RESTful manner, which facilitates organizing the interaction between the service providers and consumers. Each service has a predefined identification that both the provider and consumer agree upon, together with a set of parameters that the service implementation supports.

(ii) Service and dependency registry. There is a need for a reliable infrastructure for IoT devices to advertise or publish the services they are able to provide and subscribe to the services they depend on. In an ad-hoc IoT network, there is usually no centralized infrastructure dedicated for this purpose. Instead, a self-organized distributed infrastructure is more appropriate. In this regards, we leverage the consensus-based coordination ensemble to build a registry (140 in FIG. 1) thereby allowing the required reliability and availability.

(iii) Task Assignment. Illustrative embodiments implement a simple task assignment algorithm that fulfills the match-making between the service consumer and provider. Since it is simple, it can be embedded in many of the IoT devices. At any given time, there is only one device that exercises the role of task assigner. To accomplish this, we leverage the aforementioned coordination ensemble to elect one leader that acts as the task assigner. The current task assignment information is kept in the registry also, when the task assigner is down, other devices get notified and they begin to compete for the new leader. Once elected as the task assigner, the device can continue with the 'state' stored in the registry.

We now illustrate how to construct the core coordination facility for a self-organizing task assignment for an IoT network according to one illustrative embodiment.

In this embodiment, we use and then extend Raft as the coordination infrastructure for the ensemble (130 in FIG. 1) in the IoT network. Raft is a protocol that can be used to build replicated state machine, which is a general-purpose building block for a fault-tolerant system. We use Raft in this embodiment instead of other distributed consensus protocols for the following reasons. Raft's consensus algorithm is safe under all conditions (with former proof) and available under typical operation. Raft is designed to be simple and understandable, which makes it easier to have a light-weight implementation with regards to the footprint and runtime resources required and embedded in an IoT device. Log compaction is provided by Raft, and this effectively reduces the storage requirement in running the coordination infrastructure. Raft defines solutions to very practical problems such as membership change, and this is important given the ad-hoc nature of IoT networks and the load balancing required to judiciously use the resources available on the IOT devices. However, it is to be understood that consensus protocols other than Raft can be adapted for use in embodiments of the invention.

In accordance with an illustrative embodiment of the invention, the load-balance feature works by rotating the use of candidate devices (from set 120 in FIG. 1) as members of the coordination ensemble (130 in FIG. 1). To accomplish that, some devices are configured with the corresponding implementation and one of them will be the leader that wins the leader election via Raft. The leader tracks the status and monitors the resource usage of the ensemble members (130) and candidate members (120), issuing membership changes to the Raft cluster (ensemble) at appropriate times.

Likewise, there will also be some devices that are configured to implement service orchestration functionality. The elected leader device will exercise the role of actual service orchestrator who conducts matchmaking between service provider and consumer. In addition, service publishing and subscribing functionality requires service provider and consumer to leverage the Raft consensus infrastructure for storing relevant data for further coordination, i.e., service orchestration.

FIG. 2 illustratively summarizes a self-organizing task coordination ensemble formation methodology 200 for use in a distributed ad-hoc computing environment, according to an embodiment of the invention. By way of example, methodology 200 can be employed in computing environment 100 of FIG. 1.

As shown, step 210 discovers processing nodes in a distributed ad-hoc computing environment, wherein each processing node is configured to discover other processing nodes. Step 220 selects a set of candidate processing nodes from the discovered processing nodes, wherein selection is based on each discovered processing node advertising its own capabilities to other processing nodes, and processing nodes are selected as candidates based on their advertised capabilities.

Step 230 forms a subset of processing nodes from the set of candidate processing nodes, wherein the subset of processing nodes form a self-organized task coordination ensemble wherein each processing node in the task coordination ensemble executes the same consensus protocol.

As an example of a processing platform on which an ad-hoc computing environment such as an IoT network (e.g., 100 of FIG. 1) can be implemented is processing platform 300 shown in FIG. 3. It is to be appreciated that processing platform 300 may implement the functionalities described herein.

The processing platform 300 in this embodiment comprises a plurality of processing devices, denoted 302-1, 302-2, 302-3, . . . 302-N, which communicate with one another over a network 304. It is to be appreciated that the methodologies described herein may be executed in one such processing device 302, or executed in a distributed manner across two or more such processing devices 302. It is to be further appreciated that a server, a client device, a computing device or any other processing platform element may be viewed as an example of what is more generally referred to herein as a "processing device." As illustrated in FIG. 3, such a device generally comprises at least one processor and an associated memory, and implements one or more functional modules for instantiating and/or controlling features of systems and methodologies described herein. Multiple elements or modules may be implemented by a single processing device in a given embodiment.

The processing device 302-1 in the processing platform 300 comprises a processor 310 coupled to a memory 312. The processor 310 may comprise a microprocessor, a microcontroller, an application-specific integrated circuit (ASIC), a field programmable gate array (FPGA) or other type of processing circuitry, as well as portions or combinations of such circuitry elements. Components of systems as disclosed herein can be implemented at least in part in the form of one or more software programs stored in memory and executed by a processor of a processing device such as processor 310. Memory 312 (or other storage device) having such program code embodied therein is an example of what is more generally referred to herein as a processor-readable storage medium. Articles of manufacture comprising such processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 312 may comprise electronic memory such as random access memory (RAM), read-only memory (ROM) or other types of memory, in any combination. The one or more software programs when executed by a processing device such as the processing device 302-1 causes the device to perform functions associated with one or more of the components/steps of system/methodologies in FIGS. 1 and 2. One skilled in the art would be readily able to implement such software given the teachings provided herein. Other examples of processor-readable storage media embodying embodiments of the invention may include, for example, optical or magnetic disks.

Processing device 302-1 also includes network interface circuitry 314, which is used to interface the device with the network 304 and other system components. Such circuitry may comprise conventional transceivers of a type well known in the art.

The other processing devices 302 (302-2, 302-3, . . . 302-N) of the processing platform 300 are assumed to be configured in a manner similar to that shown for computing device 302-1 in the figure.

Also, numerous other arrangements of servers, clients, computers, storage devices or other components are possible in processing platform 300. Such components can communicate with other elements of the processing platform 300 over any type of network, such as a wide area network (WAN), a local area network (LAN), a satellite network, a telephone or cable network, or various portions or combinations of these and other types of networks.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of data processing systems, processing devices and distributed infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method, comprising:
   discovering processing nodes in a distributed ad-hoc wireless computing environment comprising an Internet of Things (IoT) network, wherein each processing node is configured to discover other processing nodes, wherein the processing nodes are IoT devices;
   selecting a set of candidate processing nodes from the discovered processing nodes, wherein selection is based on each discovered potential-candidate processing node advertising its own capabilities to other potential-candidate processing nodes, and potential-candidate processing nodes being selected as candidates based on their advertised capabilities; and
   forming a subset of processing nodes from the set of candidate processing nodes, wherein the subset of processing nodes form a self-organized task coordination ensemble wherein each processing node in the task coordination ensemble executes the same consensus protocol;
   wherein the task coordination ensemble is leveraged to elect one of the processing nodes as a leader in the task coordination ensemble;
   wherein the leader exclusively functions as a task assigner at a given time instance;
   wherein each processing node in the task coordination ensemble is capable of serving as the leader during a given time period; and
   wherein each processing node in the task coordination ensemble comprises a state machine such that the same state machine representation is replicated in each processing node and each processing node is thus able to perform the same task when one processing node in the ensemble fails.

2. The method of claim 1, further comprising the task coordination ensemble balancing a processing load across each processing node of the task coordination ensemble.

3. The method of claim 1, further comprising identifying processing nodes in the task coordination ensemble as at least one of a service provider and a service consumer.

4. The method of claim 3, wherein the processing nodes in the task coordination ensemble publish services they can provide and subscribe to services upon which they depend.

5. The method of claim 4, further comprising the task coordination ensemble maintaining a service and dependency registry based on the publishing and subscribing functions of the processing nodes of the task coordination ensemble.

6. The method of claim 1, further comprising adding a new processing node from the set of candidate processing nodes to the task coordination ensemble when one of the existing processing nodes in the task coordination ensemble fails.

7. The method of claim 1, wherein advertised capabilities used to select processing nodes as candidates comprise at least one of: computing power, storage durability; inter-processing node connection reliability; and power supply capacity.

8. The method of claim 7, wherein processing nodes are selected as candidate processing nodes when they meet a predetermined minimum threshold for their advertised capabilities.

9. The method of claim 1, wherein the advertised capabilities used to select processing nodes as candidates are advertised via a REST-based interface.

10. The method of claim 1, wherein at least two of the processing nodes are different IoT devices having different capabilities, and include at least one of a smartphone, a sensor, an actuator, or an RFID tag.

11. A method, comprising:
a given processing node in a distributed ad-hoc wireless computing environment comprising an Internet of Things (IoT) network and participating in a discovery stage as a potential-candidate processing node by advertising its capabilities to other potential-candidate processing nodes in the distributed ad-hoc computing environment, wherein the given processing node is selected into a set of candidate processing nodes based on its own capabilities meeting a predetermined minimum threshold; and
the given processing node participating in a subset of processing nodes from the set of candidate processing nodes to form a self-organized task coordination ensemble, wherein each processing node in the task coordination ensemble executes the same consensus protocol and wherein the processing nodes are IoT devices;
wherein the task coordination ensemble is leveraged to elect one of the processing nodes as a leader in the task coordination ensemble;
wherein the leader exclusively functions as a task assigner at a given time instance;
wherein each processing node in the task coordination ensemble is capable of serving as the leader during a given time period; and
wherein each processing node in the task coordination ensemble comprises a state machine such that the same state machine representation is replicated in each processing node and each processing node is thus able to perform the same task when one processing node in the ensemble fails.

12. The method of claim 11, further comprising the processing node participating in a balancing of a processing load across each processing node of the task coordination ensemble.

13. The method of claim 11, further comprising identifying processing nodes in the task coordination ensemble as at least one of a service provider and a service consumer.

14. The method of claim 13, wherein the processing nodes in the task coordination ensemble publish services they can provide and subscribe to services upon which they depend.

15. The method of claim 11, further comprising adding a new processing node from the set of candidate processing nodes to the task coordination ensemble when one of the existing processing nodes in the task coordination ensemble fails.

16. The method of claim 11, wherein advertised capabilities used to select processing nodes as candidates comprise at least one of: computing power, storage durability; inter-processing node connection reliability; and power supply capacity.

17. The method of claim 16, wherein processing nodes are selected as candidate processing nodes when they meet a predetermined minimum threshold for their advertised capabilities.

18. A system, comprising:
a set of physical processing devices; and
a set of processing nodes in a distributed wireless ad-hoc computing environment comprising an IoT network, the processing nodes being IoT devices and implemented on the set of physical processing devices, the set of processing nodes configured to form a self-organized task coordination ensemble, the task coordination ensemble being formed by: discovering processing nodes in the distributed ad-hoc computing environment, wherein each processing node is configured to discover other processing nodes; selecting a set of candidate processing nodes from the discovered processing nodes, wherein selection is based on each discovered potential-candidate processing node advertising its own capabilities to other potential-candidate processing nodes, and potential-candidate processing nodes being selected as candidates based on their advertised capabilities; and forming a subset of processing nodes from the set of candidate processing nodes, wherein the subset of processing nodes form the self-organized task coordination ensemble, wherein each processing node in the task coordination ensemble executes the same consensus protocol;
wherein the task coordination ensemble is leveraged to elect one of the processing nodes as a leader in the task coordination ensemble;
wherein the leader exclusively functions as a task assigner at a given time instance;
wherein each processing node in the task coordination ensemble is capable of serving as the leader during a given time period; and
wherein each processing node in the task coordination ensemble comprises a state machine such that the same state machine representation is replicated in each processing node and each processing node is thus able to perform the same task when one processing node in the ensemble fails.

19. The system of claim 18, wherein a processing load is balanced across each of the processing nodes of the task coordination ensemble.

20. The system of claim 18, wherein at least two of the processing nodes are different IoT devices having different capabilities, and include at least one of a smartphone, a sensor, an actuator, or an RFID tag.

* * * * *